(12) United States Patent
Yuasa et al.

(10) Patent No.: US 9,126,573 B2
(45) Date of Patent: Sep. 8, 2015

(54) BRAKING FORCE CONTROL APPARATUS FOR A VEHICLE

(75) Inventors: Hitoshi Yuasa, Susono (JP); Osamu Sato, Numazu (JP); Toshinori Okita, Gotenba (JP); Takeshi Nanami, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 298 days.

(21) Appl. No.: 13/700,267

(22) PCT Filed: May 27, 2010

(86) PCT No.: PCT/JP2010/059040
§ 371 (c)(1),
(2), (4) Date: Mar. 18, 2013

(87) PCT Pub. No.: WO2011/148495
PCT Pub. Date: Dec. 1, 2011

(65) Prior Publication Data
US 2013/0173132 A1 Jul. 4, 2013

(51) Int. Cl.
*B60T 13/66* (2006.01)
*B60T 8/1755* (2006.01)
(Continued)

(52) U.S. Cl.
CPC ............ *B60T 8/17558* (2013.01); *B60T 7/22* (2013.01); *B60W 30/09* (2013.01); *B60W 30/0953* (2013.01); *B60W 30/0956* (2013.01); *B60T 2201/022* (2013.01); *B60W 10/188* (2013.01); *B60W 2540/18* (2013.01); *B60W 2720/403* (2013.01)

(58) Field of Classification Search
USPC .............................. 701/36, 41, 70, 71, 78, 83
See application file for complete search history.

(56) References Cited

U.S. PATENT DOCUMENTS

2001/0054954 A1 12/2001 Matsumoto et al.
2003/0220738 A1 11/2003 Abe et al.
(Continued)

FOREIGN PATENT DOCUMENTS

JP 10 138894 5/1998
JP 11-203598 A 7/1999
(Continued)

OTHER PUBLICATIONS

International Search Report Issued Aug. 24, 2010 in PCT/JP10/59040 Filed May 27, 2010.

*Primary Examiner* — Adam Tissot
(74) *Attorney, Agent, or Firm* — Oblon, McClelland, Maier & Neustadt, L.L.P.

(57) ABSTRACT

In a braking force control apparatus which controls a braking force applied to a vehicle based on a relation thereof with an obstacle ahead of the vehicle, irrespective of a braking operation of a driver, a lateral force is predicted which can be generated in cases where avoidance steering is carried out by the driver, in order to avoid an obstacle which has been detected, and an actual braking force actually applied to a longitudinal direction of the vehicle is limited in accordance with a braking force which can be applied in the longitudinal direction of the vehicle and which is calculated based on the lateral force thus predicted. According to this, in the braking force control apparatus which controls the braking force of the vehicle, the lateral force for avoiding a collision with the obstacle by means of steering is obtained.

9 Claims, 6 Drawing Sheets

(51) Int. Cl.
  *B60T 7/22* (2006.01)
  *B60W 30/09* (2012.01)
  *B60W 30/095* (2012.01)
  *B60W 10/188* (2012.01)

(56) References Cited

U.S. PATENT DOCUMENTS

2004/0088097 A1   5/2004   Fujinami et al.
2009/0228174 A1 * 9/2009   Takagi et al. .................. 701/41

FOREIGN PATENT DOCUMENTS

| JP | 2000 128007 | 5/2000 |
| JP | 2002 4931 | 1/2002 |
| JP | 2003 175810 | 6/2003 |
| JP | 2003 341501 | 12/2003 |
| JP | 2004 155241 | 6/2004 |
| JP | 2004 155303 | 6/2004 |
| JP | 2005 132172 | 5/2005 |
| JP | 2007 253746 | 10/2007 |
| JP | 2007253746 A * | 10/2007 |
| JP | 2007 331459 | 12/2007 |

* cited by examiner

BRAKING FORCE CONTROL APPARATUS FOR A VEHICLE

TECHNICAL FIELD

The present invention relates to a braking force control apparatus which controls a braking force applied to a vehicle based on a relation thereof with an obstacle ahead of the vehicle, irrespective of a braking operation of a driver.

BACKGROUND ART

In the past, in order to prevent a collision accident and a rear end collision accident, the following has been carried out. That is, an obstacle ahead of a vehicle is detected, and when the vehicle is approaching the obstacle, with the distance from the vehicle to the obstacle exceeding a threshold value, a braking force is applied to the vehicle in a forced manner, thereby reducing the speed of the vehicle. On the other hand, when the driver recognizes approaching the obstacle and is going to avoid the collision with the vehicle by carrying out avoidance steering, if a braking force is applied to the vehicle in a forced manner without taking the avoidance steering into consideration, the braking of the vehicle due to the braking force and the avoidance steering may interfere with each other, so that a sufficient avoidance effect has not often been obtained. Accordingly, there has been disclosed a technique in which a maximum braking force that can be generated on the vehicle is calculated from a lateral force generated by the avoidance steering of the driver, by making use of a so-called circle of friction, and a maximum value of the braking force is set to this calculated value, thereby making it possible to carry our effective collision avoidance (see, for example, Patent Document 1).

In addition, there has been disclosed another technique in which in order to avoid interference between the braking of the vehicle due to the braking force and the avoidance steering, the braking force to be applied is decreased under the condition that such interference is likely to occur (see, for example, Patent Document 2). In such a technique, in cases where collision avoidance by steering is possible, the braking force to be applied is set lower in comparison with the case where it is judged that the collision avoidance by steering is impossible. This attains effective collision avoidance.

PRIOR ART REFERENCES

Patent Documents

[Patent Document 1] Japanese patent application laid-open No. H10-138894
[Patent Document 2] Japanese patent application laid-open No. 2004-155241
[Patent Document 3] Japanese patent application laid-open No. 2003-175810
[Patent Document 4] Japanese patent application laid-open No. 2003-341501
[Patent Document 5] Japanese patent application laid-open No. 2002-004931
[Patent Document 6] Japanese patent application laid-open No. 2000-128007
[Patent Document 7] Japanese patent application laid-open No. 2007-331459
[Patent Document 8] Japanese patent application laid-open No. 2005-132172
[Patent Document 9] Japanese patent application laid-open No. 2004-155303

SUMMARY OF THE INVENTION

Problems to be Solved by the Invention

In cases where a braking force is applied to a vehicle without a braking operation of a driver, in order to avoid a collision between the running vehicle and an obstacle, when avoidance steering by the driver is carried out at the same time therewith, both of the braking force and the avoidance steering interfere with each other, so that a sufficient avoidance effect can not be obtained. On the other hand, in cases where a maximum braking force that can be generated on the vehicle is calculated from a lateral force generated by the avoidance steering of the driver, by making use of a so-called circle of friction so that a maximum value of the braking force is to be set to this calculated value, it has been difficult for a resultant force of an actual lateral force and the braking force to stay inside the circle of friction due to the variation or change of the lateral force or the like by the avoidance steering, thus making it difficult to achieve effective collision avoidance.

In addition, in cases where the avoidance of collision by steering is possible, only by setting a relatively low braking force, the braking force may still be too large in view of the fact that the lateral force at the time of avoiding the obstacle is usually relatively large, and as a result, it may become difficult to ensure a sufficient lateral force for obstacle avoidance.

The present invention has been made in view of the above-mentioned problems, and has for its object to provide a braking force control apparatus for a vehicle in which a braking force applied to the vehicle is controlled based on a relation thereof with an obstacle ahead of the vehicle, irrespective of a braking operation of a driver, and which is capable of ensuring a lateral force for avoiding a collision with an obstacle by means of steering.

Means for Solving the Problems

In the present invention, in order to achieve the above-mentioned object, there has been adopted a construction in which a lateral force generated at the time when avoidance steering for avoiding an obstacle is carried out is predicted, and an actual braking force actually applied to a longitudinal direction of the vehicle is limited in accordance with a braking force in the longitudinal direction of the vehicle which is calculated based on the lateral force thus predicted. According to this, it becomes possible to leave a lateral force necessary for avoiding a collision with the obstacle by means of steering of a driver to a necessary and sufficient extent, whereby when avoidance steering by the driver is actually carried out, the vehicle can avoid the collision with the obstacle. Here, note that in this description, the "longitudinal direction" is a direction in which a driving force of the vehicle propagates to a road surface, and the "lateral direction" is a direction orthogonal to the longitudinal direction.

Thus, specifically, the present invention resides in a braking force control apparatus which controls a braking force applied to a vehicle based on a relation thereof with an obstacle ahead of the vehicle, irrespective of a braking operation of a driver, and which is provides with an obstacle detection part that detects the obstacle located ahead of said vehicle, a lateral force prediction part that predicts a lateral force which can be generated in cases where avoidance steering is carried out by the driver, in order to avoid the obstacle detected by said obstacle detection part, and a braking force control part that limits an actual braking force actually applied to the vehicle in a longitudinal direction, in accordance with a longitudinal braking force of the vehicle which is calculated based on a friction of the vehicle with respect to a road surface on which said vehicle is running, and the lateral force predicted by said lateral force prediction part.

The braking force control apparatus for a vehicle according to the present invention is to make it possible to avoid a collision between the vehicle and the obstacle by applying a braking force (hereinafter also referred to as a "forced braking force") which is applied in a forced manner irrespective of the presence or absence of a braking operation of the driver. Here, avoidance steering may be carried out by the driver himself or herself in order to avoid the obstacle, and at that time, it is preferable that a sufficient lateral force for collision avoidance be able to be generated. Accordingly, with the above-mentioned braking force control apparatus, it is constructed such that when an obstacle ahead of the vehicle is detected by the obstacle detection part, the actual braking force which is actually applied in a forced manner is limited.

Specifically, when an obstacle is detected, a lateral force which is generated on the vehicle when the obstacle is temporarily avoided by avoidance steering is predicted by the lateral force prediction part. This predicted lateral force can also be said to be a lateral force which should be ensured in order to enable collision avoidance to be carried out by avoidance steering. Then, a braking force, which can be applied to the longitudinal direction of the vehicle, is calculated based on this lateral force and a friction of the vehicle with respect to the road surface by means of the braking force control part, and the forced braking force to be actually applied (actual braking force) is limited in accordance with the thus calculated theoretical value, whereby it becomes possible to ensure a lateral force necessary for avoidance steering.

Moreover, the construction may be such that said lateral force prediction part predicts said lateral force which can be generated, by changing it in accordance with an avoidance lateral width distance for avoiding the obstacle detected by said obstacle detection part. In view of the fact that as the avoidance lateral width distance becomes larger, a distance to be moved per unit time for collision avoidance accordingly becomes larger, prediction may be carried out in such a manner that the lateral force necessary for collision avoidance becomes larger in accordance with the increasing avoidance lateral width distance.

Here, in the above-mentioned braking force control apparatus, it may be constructed as follows. That is, said lateral force prediction part predicts a change over time of the lateral force which can be generated in cases where avoidance steering is carried out by the driver, in order to avoid the obstacle detected by said obstacle detection part, and said braking force control part calculates the change over time of the braking force which can be applied to the longitudinal direction of the vehicle, based on a friction thereof with a road surface on which said vehicle is running, and the change over time of the lateral force predicted by said lateral force prediction part, and limits the actual braking force so that an interference ratio of the change over time of the reduction of said actual braking force according to a predetermined reduction processing which is carried out when avoidance steering of the driver is detected at the time of application of the braking force, with respect to the calculated change over time of the braking force which can be applied to the vehicle in the longitudinal direction thereof becomes equal to or less than a predetermined ratio.

The change over time of the lateral force predicted by the lateral force prediction part is a so-called locus of the variation over time of the lateral force. Thus, by carrying out limitation processing of the actual braking force based on the change of the lateral force required until the vehicle has avoided the obstacle, while taking into consideration the change over time of the lateral force, it becomes possible to ensure the changing lateral force in an exact manner. Specifically, the change over time of the braking force which can be applied in the longitudinal direction is calculated in association with the predicted change over time of the lateral force for obstacle avoidance. On the other hand, in the above-mentioned braking force control apparatus, when the avoidance steering by the driver is detected, the predetermined reduction processing to reduce the actual braking force is to be carried out for the purpose of ensuring the lateral force for obstacle avoidance. Then, the limitation processing of the actual braking force by means of the braking force control part is carried out so that the thus calculated change over time of the braking force and the change over time of the actual braking force by means of the predetermined reduction processing become a predetermined correlation, i.e., a ratio of interference between both of the calculated change over time of the braking force and the change over time of the actual braking force becomes equal to or less than the predetermined ratio. That is, the limitation processing of the actual braking force is carried out in such a manner that it becomes possible to achieve reduction processing of the actual braking force with the avoidance steering of the driver to be carried out later being used as a start point. Here, said predetermined ratio is set as such a value that the vehicle behavior at the time of avoidance steering being actually carried out by the driver can avoid said obstacle. For example, a value with which the vehicle behavior is maintained, by means of the avoidance steering, at such a level that there is no safety problem can be adopted as the predetermined ratio. Here, note that this predetermined ratio may be zero.

With such a construction, the braking force control apparatus for a vehicle according to the present invention serves to limit the actual braking force based on the change over time of the lateral force which is generated temporarily (the predicted change over time of the lateral force), when an obstacle has been detected during traveling of the vehicle. Stated in another way, before avoidance steering by the driver is carried out, limitation processing of the actual braking force is carried out in consideration of the predetermined reduction processing to be executed when avoidance steering is thereafter carried out. For that reason, even if the avoidance steering by the driver is actually carried out, it becomes possible to ensure a lateral force for avoidance of the obstacle to a sufficient extent.

Here, in the above-mentioned braking force control apparatus, in a vicinity where said calculated change over time of the braking force which can be applied in the longitudinal direction becomes zero, said braking force control part may limit said actual braking force in such a manner that a period of time in which the change over time of the reduction of said actual braking force interferes with the change over time of said braking force becomes equal to or less than a predetermined period of time which corresponds to said predetermined ratio. The vicinity where said calculated braking force change over time becomes zero is a location where it is easy to interfere with the actual braking force which is reducing over time according to the predetermined reduction processing. Accordingly, by making the time of interference between the braking force change over time and the reduction change over time at that location equal to or less than a predetermined interference time, it becomes possible to ensure the lateral force for avoidance of the obstacle to a sufficient extent, as mentioned above.

In the braking force control apparatus referred to thus far, provision may further be made for an avoidance steering detection part that detects an avoidance steering operation of the driver. Then, in this case, said braking force control part carries out said predetermined reduction processing which reduces said actual braking force in accordance with a predetermined straight line or a predetermined reduction curve according to an elapsed time, when the avoidance steering of the driver is detected. That is, in a state where the actual braking force is limited by the braking force control part, when avoidance steering is detected by the avoidance steering detection part, the braking force control part carries out the predetermined reduction processing of the actual braking force. Various modes of reduction processing can be used for this predetermined reduction processing, from the point of view of avoiding a collision with the obstacle, and as its examples, there are mentioned processing according to the above-mentioned predetermined straight line which reduces or decreases the actual braking force linearly with the passage of time, and processing according to the above-mentioned predetermined curve which reduces or decreases the actual braking force in a curved manner with the passage of time.

Here, in the above-mentioned braking force control apparatus referred to thus far, said lateral force prediction part may predict said change over time of the lateral force which can be generated, based on an avoidance lateral width distance for avoiding the obstacle detected by said obstacle detection part and an arrival period of time required for said vehicle to arrive at said obstacle. That is, the lateral force prediction part predicts the change over time of the lateral force which can be generated, by taking into consideration a locus followed by the vehicle, at the time when the vehicle avoids the obstacle. In this case, as an example, said lateral force prediction part may predict said change over time of the lateral force which can be generated, as a change over time of a curved line shape which has a local maximal value in the middle of avoiding said obstacle. Further, said lateral force prediction part may change said local maximal value in accordance with said avoidance lateral width distance. As the avoidance lateral width distance becomes larger, the distance to be avoided for which the vehicle should move per unit time becomes larger, and hence, in that case, the value of said local maximal value should just be made larger.

Here, in the above-mentioned braking force control apparatus referred to thus far, provision may further be made for a friction estimation part that estimates a friction of the vehicle with respect to the road surface on which said vehicle is running, based on at least one of a weather condition under which the vehicle is placed and a state of said road surface. In addition, as for friction, a friction in the case where the avoidance steering and the forced braking force tend to interfere with each other may be set as a prescribed value. In this case, for example, the friction at the time of setting a coefficient of friction to 1 can be adopted as this prescribed value, irrespective of the weather condition or the state of the road surface.

In addition, the braking force control apparatus according to the present invention can be understood as a braking force control apparatus which controls a braking force applied to a vehicle based on a relation thereof with an obstacle ahead of the vehicle, irrespective of a braking operation of a driver, and in which an actual braking force actually applied in a longitudinal direction of the vehicle is controlled based on a friction of the vehicle with respect to a road surface on which said vehicle is running, and a lateral force which can be generated in cases where avoidance steering is carried out by the driver, in order to avoid the obstacle located ahead of said vehicle, and said actual braking force is made smaller in accordance with an increasing avoidance lateral width distance for avoiding said obstacle.

Effect of the Invention

In a braking force control apparatus in which a braking force applied to a vehicle is controlled based on a relation thereof with an obstacle ahead of the vehicle, irrespective of a braking operation of a driver, it becomes possible to ensure a lateral force for avoiding a collision with an obstacle by means of steering.

MODES FOR CARRYING OUT THE INVENTION

Hereinafter, reference will be made to a braking force control apparatus 10 for a vehicle according to an embodiment of the present invention, while referring to the accompanying drawings. Here, note that the construction of the following embodiment is only an example, but the present invention is not limited to such a construction of this embodiment.

First Embodiment

Figure 1:
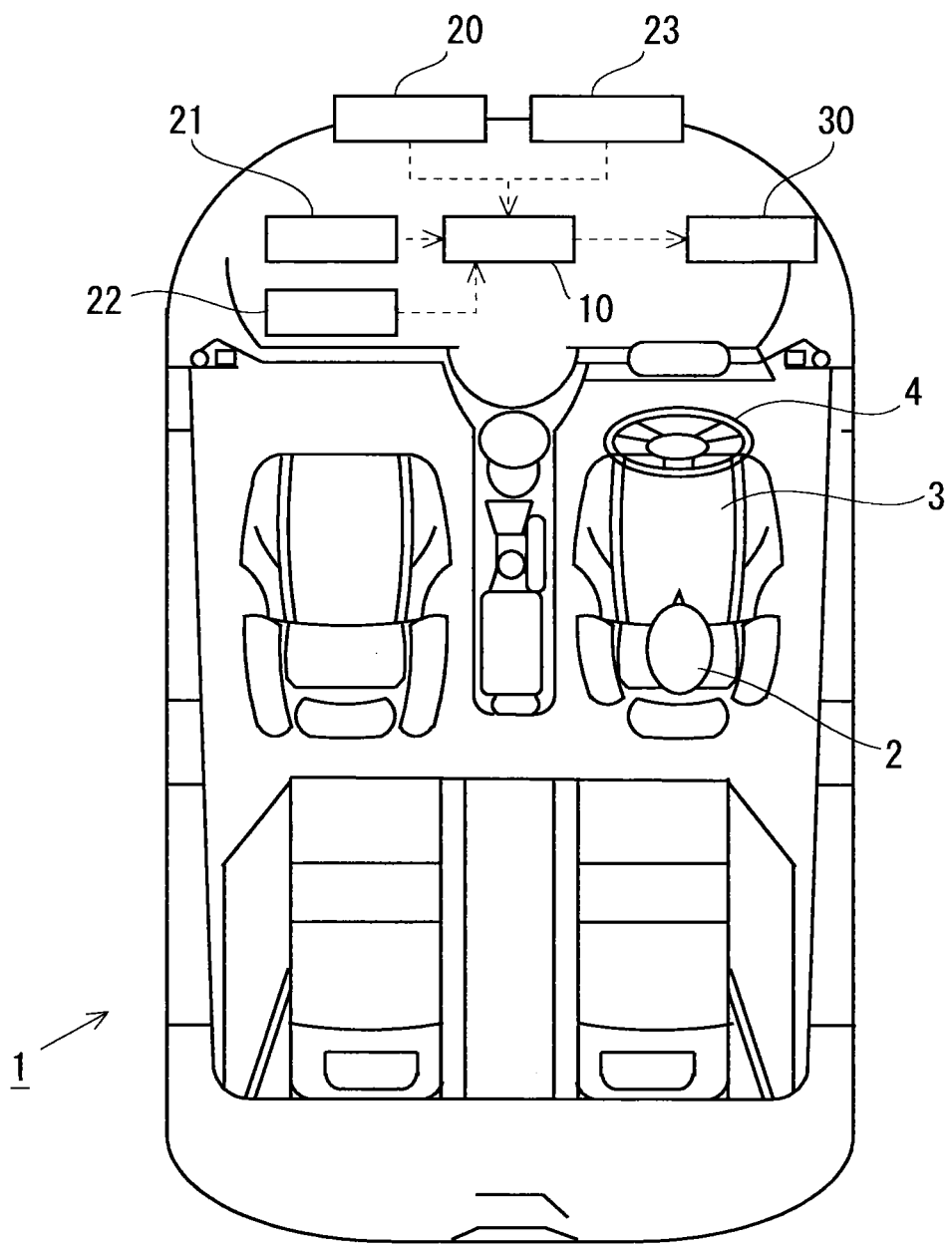
FIG. 1 is a view showing the schematic construction of a vehicle on which a braking force control apparatus according to the present invention is installed.

FIG. 1 shows the schematic construction of a vehicle on which the above-mentioned braking force control apparatus 10 according to the present invention is installed. Four seats are provided in a vehicle 1, and in FIG. 1, there is shown a state in which a driver 2 sits on a driver's seat 3. The driver 2 controls the direction of movement of the vehicle 1 by steering a steering wheel 4, while sitting on the driver's seat 3. Here, on a front side of the vehicle 1 shown in FIG. 1, there is installed a radar device 20 which is able to detect information on the relative position of an obstacle with respect to the vehicle 1, by transmitting a millimeter wave which has a forward direction of the vehicle 1 as a detection range, and by receiving reflection waves reflected by the obstacle lying outside the vehicle. In addition, a vehicle speed sensor 21 for detecting the speed of the vehicle and a yaw rate sensor 22 for detecting the yaw rate of the vehicle are installed on the vehicle 1. Then, the radar device 20, the vehicle speed sensor 21 and the yaw rate sensor 22 are electrically connected to the braking force control apparatus 10, so that the detection results of the individual device and sensors are delivered to the apparatus 10, and are devoted to braking force control to avoid a collision of the vehicle with the obstacle, which will be described later.

A vehicle mounted camera 23 for capturing a forward sight within its field of view is further mounted on the vehicle 1. Images picked up by the vehicle mounted camera 23 are also delivered to the braking force control apparatus 10, so that image processing using the images and the above-mentioned braking force control using the processing results are carried out.

Figure 2:
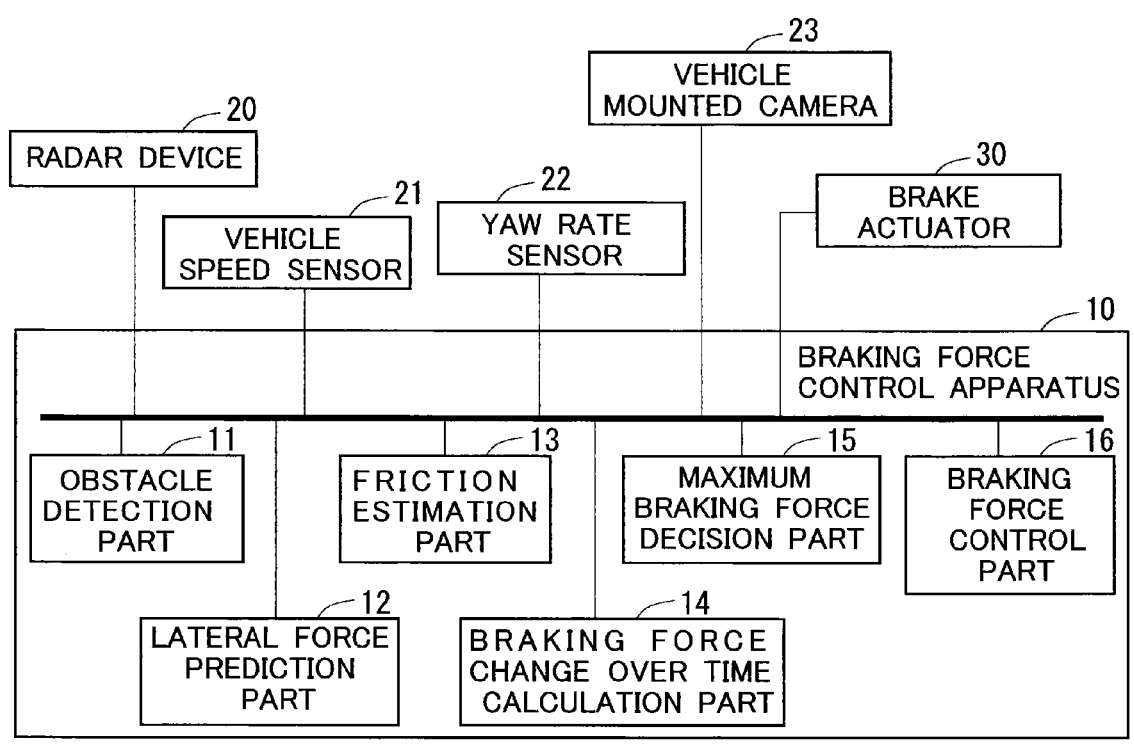
FIG. 2 is a functional block diagram which images a functional part which is possessed by the braking force control apparatus shown in FIG. 1.

Here, the braking force control apparatus 10 is a control device which, during the time when the vehicle 1 is running, provides an instruction to a brake actuator 30 of the vehicle 1 based on a distance relation between the vehicle 1 and the obstacle which is located ahead thereof, irrespective of a braking operation of the driver 2, i.e., a brake operation, and performs braking force control in such a manner that a braking force is applied to the vehicle 1 in a forced manner thereby to reduce the speed thereof, thus avoiding the collision of the vehicle with the obstacle. This break actuator 30 is a device which controls brake oil pressure, so that a braking force can be applied to the vehicle 1 by causing the oil pressure to rise. Accordingly, in FIG. 2, there is shown a functional block diagram which images the content of the control of the braking force applied to the vehicle 1, centering on the braking force control apparatus 10. The braking force control apparatus 10 shown in FIG. 2 substantially corresponds to a computer which includes a CPU, a memory, a hard disk, etc., wherein a function by each of the function blocks shown in FIG. 2 is achieved by executing a control program.

The braking force control apparatus 10 has functional parts which include an obstacle detection part 11, a lateral force prediction part 12, a friction estimation part 13, a braking force change over time calculation part 14, a maximum braking force decision part 15, and a braking force control part 16. These functional parts are absolutely examples, and the braking force control apparatus 10 may have functional parts other than these functional parts, in order to achieve a predetermined purpose. In the following, a schematic explanation of these functional parts will be made. The obstacle detection part 11 is a functional part that detects an obstacle existing ahead of the vehicle 1 based on the detection result by the radar device 20. Here, note that a technique of detecting the obstacle using the radar device 20 is a technique which has already been laid open to public, so a detailed explanation thereof is omitted in this description.

In addition, the braking force control part 16 is a function part that controls a braking force applied to the vehicle 1 through the brake actuator 30 in a forced manner. In the braking force control apparatus 10, in cases where an obstacle ahead of the vehicle 1 is detected by the obstacle detection part 11, when the obstacle is coming near relative to the vehicle, while the distance between the obstacle and the vehicle exceeds a threshold value, the braking force control part 16 causes a forced braking force to be applied to the vehicle 1, thereby attaining reduction of the speed thereof. Here, when the driver 2 is going to avoid the collision of the vehicle with the obstacle by performing avoidance steering of the steering wheel 4 to control the direction of movement of the vehicle, the forced braking by the braking force control apparatus 10 and the avoidance steering by the driver 2 will interfere with each other, thus making it difficult to avoid the collision with the obstacle in an effective manner. Accordingly, when the avoidance steering of the driver 2 is carried out during the application of the forced braking force, this braking force control part 16 also carries out predetermined reduction processing which reduces or decreases the braking force according to a predetermined reducing method. Here, note that the detection of the avoidance steering of the driver 2 is carried out based on a detection signal from the vehicle speed sensor 21 or the yaw rate sensor 22.

Further, in order to control the interfering state of the forced braking and the avoidance steering in an appropriate manner, the processing by means of the lateral force prediction part 12, the friction estimation part 13, the braking force change over time calculation part 14, and the maximum braking force decision part 15 is utilized. The lateral force prediction part 12 is a functional part that predicts, when the driver is going to avoid the obstacle excising ahead of the running vehicle 1, the change over time of the lateral force from the point of view of what kind of lateral force can occur on the vehicle 1, in other words, what kind of lateral force should be ensured in order to avoid the obstacle. That is, the lateral force prediction part 12 predicts the change over time of the lateral force which can be generated in a state in which the avoidance steering of the vehicle 1 has not yet been carried out by the driver 2, in order to avoid the obstacle. Here, note that this lateral force prediction part 12 carries out the above-mentioned change over time prediction by making use of the images picked up by means of the vehicle mounted camera 23.

Next, the friction estimation part 13 is a functional part that estimates a friction which acts between the vehicle 1 and a road surface. This functional part carries out friction estimation processing based on the weather condition, the state of the road surface, etc, in which the vehicle 1 is placed. Then, the braking force change over time calculation part 14 is a functional part that calculates the change over time of a braking force which can be applied to the longitudinal direction of the vehicle 1 as a braking force change over time, based on the lateral force change over time predicted by the lateral force prediction part 12 and the friction estimated by the friction estimation part 13. This braking force change over time calculation part 14 is to calculate the change over time of the braking force in a theoretical manner, but does not directly calculate the braking force which should actually be applied by the braking force control part 16.

In addition, the maximum braking force decision part 15 is a functional part that decides, on the assumption of the predetermined reduction processing of the forced braking carried out by the braking force control part 16, a maximum value of this actual braking force based on the correlation between the braking force change over time calculated by the braking force change over time calculation part 14 and the reduction change over time of the actual braking force to be actually applied according to the predetermined reduction processing. Then, the maximum value decided by the maximum braking force decision part 15 is set as an upper limit of the actual braking force actually applied by the braking force control part 16.

By the above-mentioned setting of the maximum value of the actual braking force, the braking force control apparatus 10 having such functional parts is made possible to carry out the predetermined reduction processing at the time of the detection of avoidance steering, and at the same time, it becomes possible to ensure a predicted lateral force necessary for steering avoidance to a necessary and sufficient extent, by suppressing the extent of interference of the reduction change over time of the actual braking force with the calculated braking force change over time to a predetermined ratio or below.

Figure 3:
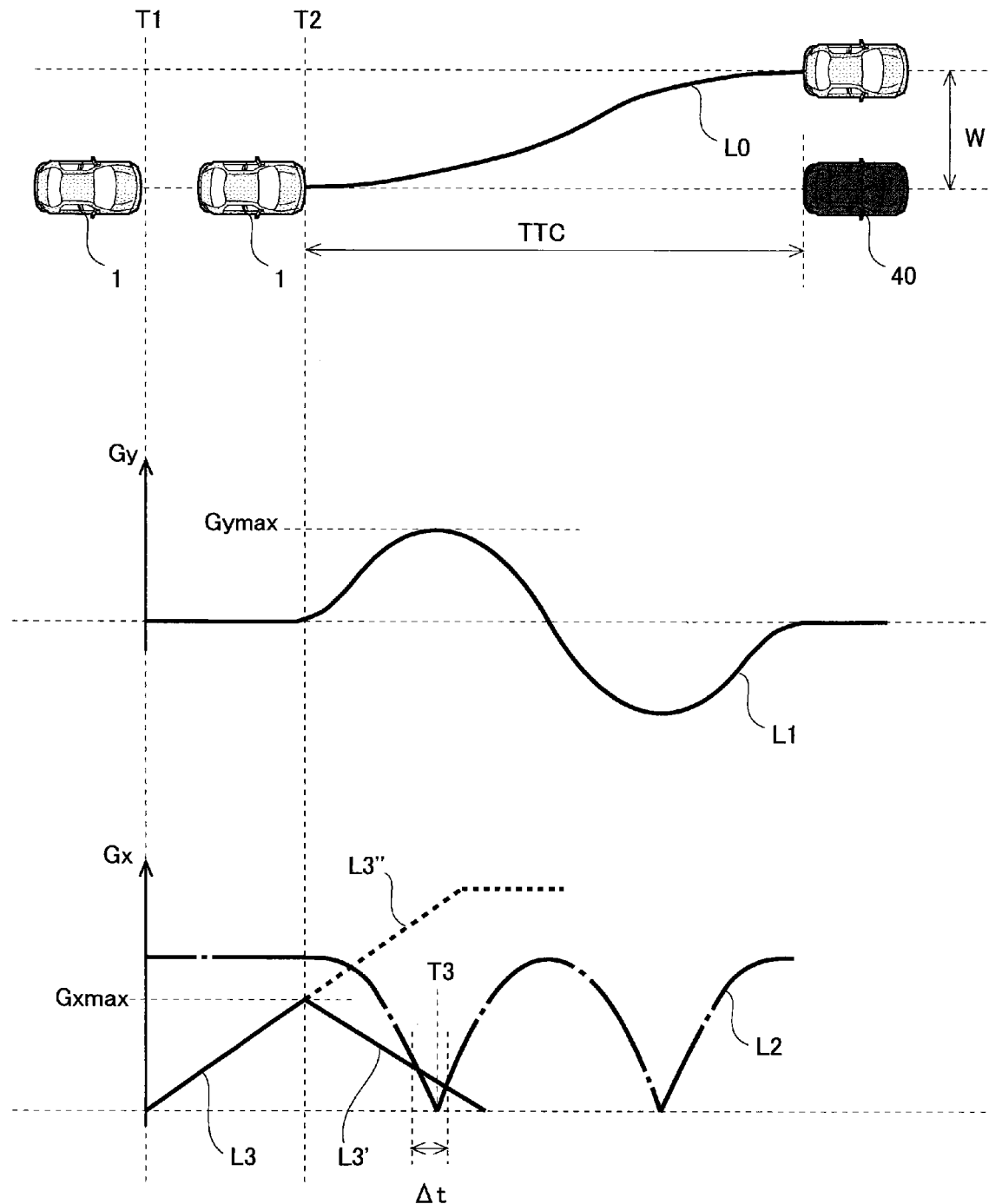
FIG. 3 is a view in which an upper row shows the locus of obstacle avoidance of a vehicle, a middle row shows the change over time of a lateral force which can be generated at the time of the avoidance, and a lower row shows the change over time of a braking force calculated based on the change over time of the lateral force and the change over time of an actual braking force which actually acts.

Now, the details of the braking force control carried out by the braking force control apparatus 10 will be described based on FIG. 3. In FIG. 3, an upper row thereof shows a locus L0 which is predicted to be followed by the vehicle 1 in cases where the vehicle 1 avoids a forward obstacle; a middle row thereof shows, by a curved line L1, the change over time of a lateral force Gy which can be generated at the time of the avoidance; and a lower row thereof represents the changes over time of a braking force Gx applied to the longitudinal direction of the vehicle 1, wherein a curved line L2 shows the change over time of the theoretical braking force Gx which can be applied and which is calculated based on the above-mentioned lateral force change over time, and a curved line L3 shows the change over time of an actual braking force which is actually applied. As for these changes over time, the lateral force change over time L1 of the vehicle 1 shown in the middle row is obtained by the above-mentioned lateral force prediction part 12, and the braking force change over time L2 shown in the lower row is obtained by the above-mentioned braking force change over time calculation part 14. In addition, in the change over time L3 of the actual braking force, a change over time L3', which reduces or decreases after timing T2, corresponds to the reduction change over time of the present invention. Here, note that timing T1 is a timing at which the application of a forced braking force by means of the braking force control apparatus 10 is started in order to avoid the collision of the vehicle with the obstacle. Accordingly, after the timing T1 has passed, the actual braking force increases linearly with the passage of time (see the line L3). Also, timing T2 indicates a point in time at which the braking force control according to the present invention is carried out.

As shown in the upper row of FIG. 3, ahead of the vehicle 1, there is located a preceding vehicle 40 as an obstacle. Accordingly, if the driver 2 does not perform any operation such as avoidance steering, deceleration, etc., with respect to the preceding vehicle 40, there will be a possibility that the vehicle 1 may collide with the preceding vehicle 40. Here, a relative positional relation of the vehicle 1 and the preceding vehicle 40 is denoted by TTC. TTC is obtained by dividing an inter-vehicle distance between the preceding vehicle 40 and the vehicle 1 by a difference in speed between the preceding vehicle 40 and the vehicle 1, and it is, so to speak, a parameter which means a period of time until the vehicle 1 collides with the preceding vehicle 40. Then, an avoidance lateral width distance, which is a distance required for the vehicle 1 to move in a lateral or transverse direction so as to avoid a collision thereof with the preceding vehicle 40 is denoted by W. That is, at the timing T2, the vehicle 1 exists in a position corresponding to TTC until it collides with respect to the preceding vehicle 40, and in order to avoid the collision by means of steering, the vehicle 1 has to move in the lateral direction by the avoidance lateral width distance along the locus indicated by the solid line L0 in the upper row of FIG. 3.

In order for the vehicle 1 to follow this locus L0, it is necessary for the driver 2 to turn the steering wheel 4 once to the left to a large extent, and thereafter to turn the steering wheel 4 back to the right, thereby restoring to a state in which the vehicle 1 goes straight on. In consideration of such actual avoidance steering of the steering wheel 4 by the driver 2, the lateral force prediction part 4 calculates, based on the above-mentioned TTC and the avoidance lateral width distance W, the change over time of the lateral force which can be generated on the vehicle 1 for instance at the time when avoidance steering is carried out, as shown in the middle row of FIG. 3. Specifically, at the time of moving the avoidance lateral width distance W in the period of time TTC, the change over time of the lateral force is predicted on the assumption that the acceleration of the vehicle 1 in the lateral direction varies smoothly based on the driver's operation of the actual vehicle. For example, as shown in the middle row of FIG. 3, at timing T2 at which the driver 2 is assumed to start avoidance steering, the lateral force increases gradually from zero, reaches a peak magnitude Gymax of a positive value at a predetermined point in time, then decreases smoothly, and reaches a peak magnitude of a negative value, after which it smoothly returns to zero. Here, note that it is preferable for the prediction of the lateral force change over time to be made by taking into consideration the actual avoidance steering by the driver 2, as referred to above, but in order to reduce the processing load of the braking force control according to the present invention, such a prediction may be a simple form of lateral force change over time, such as expressing the change over time of the lateral force in a linear manner.

In addition, there is in general a tendency that the value of the maximum value Gymax of the lateral force in the lateral force change over time becomes larger as the value of the TTC becomes smaller, and it also becomes larger as the value of the avoidance lateral width distance W becomes larger.

Then, the braking force change over time calculation part 14 calculates a theoretical change over time of the braking force in the longitudinal direction according to the following equation based on the lateral force change over time as shown in the middle row, wherein the braking force change over time Gx thus calculated is represented by the line L2 of an alternate long and short dash line in the lower row of FIG. 3.

$$Gx = \sqrt{(\Xi^2 - Gy^2)}$$

μ: a coefficient of friction between the vehicle and the road surface

Gy: the predicted lateral force change over time which is shown in the middle row of FIG. 3

Here, the coefficient of friction μ is estimated by the friction coefficient estimation part 13, the details of which will be described later.

Then, the maximum braking force decision part 15 decides a maximum value Gxmax of the actual braking force at the timing T2 based on a correlation between the braking force change over time which is represented by the line L2 and the actual braking force change over time, in particular, a correlation between the braking force change over time and the reduction change over time L3' of the actual braking force followed by the predetermined reduction processing which is carried out by the braking force control part 16. In the embodiment shown in FIG. 3, this predetermined reduction processing is processing which reduces or decreases the actual braking force from an actual braking force at the time when the actual avoidance steering of the driver 2 is detected, according to a straight line with a fixed slope. Then, this slope of the straight line is a constant which is suitably set within a range in which the reduction of the braking force does not have any influence on the running performance of the vehicle 1, etc., and 0.6 G/sec can be adopted as an example.

A specific decision of the maximum value Gxmax of the actual braking force is made as follows. At the point in time of timing T2, the reduction change over time L3' with a fixed slope is shifted in a time base direction so that a time length Δt of an interval in which the reduction change over time L3' and the braking force change over time L2 interfere with each other becomes equal to or less than a predetermined period of time Δt0 which is a criterion or reference. Then, a point at which the reduction change over time L3' intersects a braking force axis at the point in time of timing T2 is decided as the maximum value Gxmax of the actual braking force in the point in time of timing T2. Specifically, in the braking force change over time L2, the braking force which can be applied becomes zero at timing T3. For that reason, based on the fact that in the vicinity of this timing T3, the reduction change over time L3' becomes liable to interfere with the braking force change over time L2, the maximum value Gxmax is decided such that the value of the interference time length Δt in the above vicinity will become equal to or less than the predetermined period of time Δt0. Here, note that the state where the reduction change over time L3' and the braking force change over time L2 have interfered with each other is a state in which the actual braking force exceeds a braking force which can be theoretically applied, and hence, it is difficult to ensure a lateral force necessary for obstacle avoidance. However, the applicant has experimentally obtained a knowledge that in cases where the interference time Δt between the reduction change over time L3' and the braking force change over time L2 is equal to or less than the predetermined period of time Δt0, there will be no substantial problem in the running performance of the vehicle 1. Accordingly, even if the maximum value Gxmax of the actual braking force is decided in such a manner that the interference time length Δt becomes equal to or less than the predetermined period of time Δt0, as referred to above, there will be no substantial problem. Here, note that 0.1 seconds can be adopted as an example of the predetermined period of time Δt0.

Figure 4A:
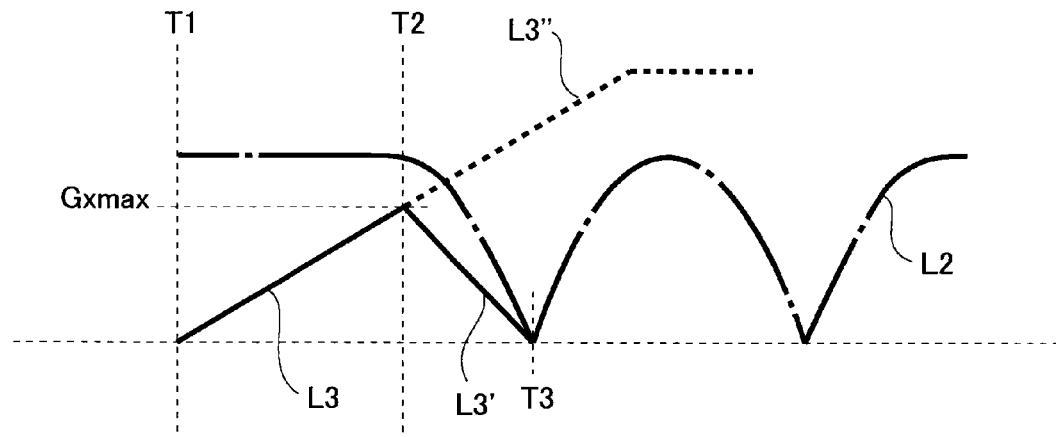
FIG. 4A is a view showing second modes of the change over time of the braking force shown in the lower row of FIG. 3, and the change over time of the actual braking force, respectively.

Of course, the maximum value Gxmax of the actual braking force may be decided in such a manner that the interference time length Δt between the reduction change over time L3' and the braking force change over time L2 becomes zero, as shown in FIG. 4A. In this case, in a theoretical sense, ensuring of the lateral force necessary for obstacle avoidance will also be secured.

Figure 4B:
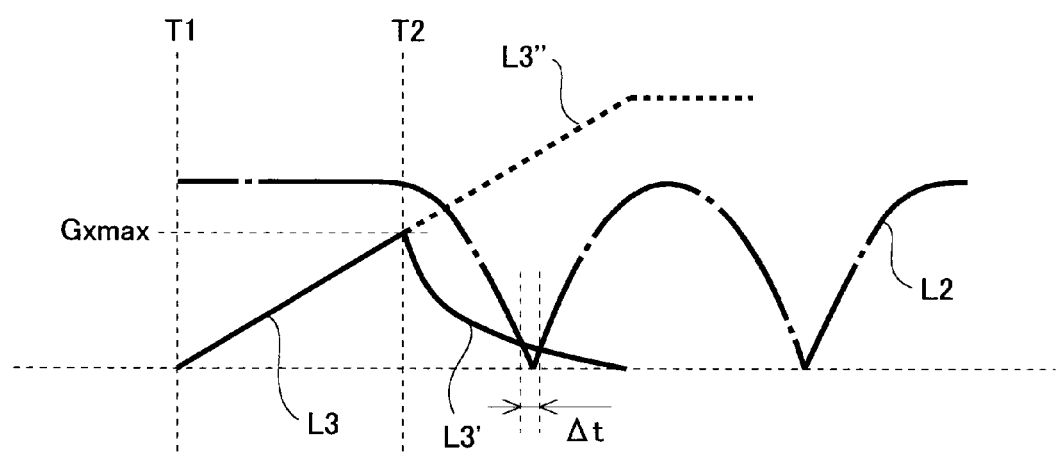
FIG. 4B is a view showing third modes of the change over time of the braking force shown in the lower row of FIG. 3, and the change over time of the actual braking force, respectively.

In addition, the predetermined reduction processing by the braking force control part 16 may be not only the processing to reduce the actual braking force in a linear manner, but also processing to reduce it in a curved manner, as shown in FIG. 4B. Even in such a case, the maximum value Gxmax of the actual braking force is decided so that the interference time length Δt between the reduction change over time L3' and the braking force change over time L2 can become zero.

The braking force control part 16 carries out the control of applying a forced braking force by using the maximum value Gxmax decided in this manner as the upper limit of the actual braking force which is actually applied. That is, during the time from the above-mentioned timing T1 until the actual avoidance steering of the driver 2 is detected, the decision of the above-mentioned maximum value Gxmax of the actual braking force and the control of the actual braking force using it as the upper limit are carried out. Then, when the actual avoidance steering of the driver 2 is detected, the predetermined reduction processing by the braking force control part 16 will be carried out. According to such braking force control, it becomes possible to ensure the lateral force for obstacle avoidance to a necessary and sufficient extent.

Here, note that in the lower row of FIG. 3, FIG. 4A and FIG. 4B, changes over time L3" of the actual braking force indicated by dotted lines show the changes over time of the actual braking force, respectively, in cases where the limitation processing at the maximum value Gxmax by means of the above-mentioned braking force control part 16 has not been carried out. These changes over time L3" are followed in cases where the vehicle 1 is going to be decelerated only by the braking force by means of the braking force control part 16.

Figure 5:
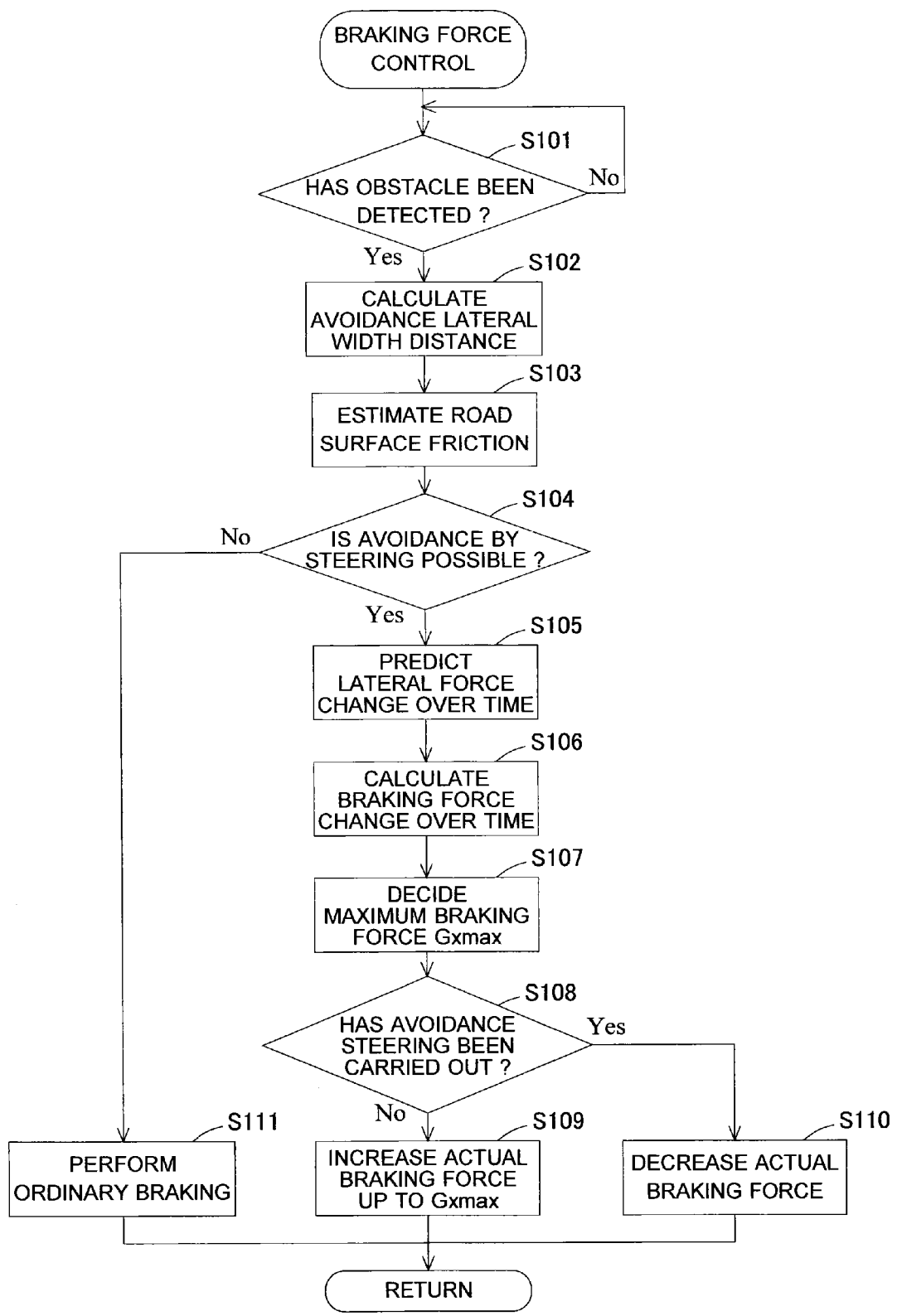
FIG. 5 is a first flow chart with respect to the braking force control carried out by the braking force control apparatus shown in FIG. 1.

Here, reference will be made below to the control of the braking force in the vehicle 1 including the braking force control shown in FIG. 3 based on FIG. 5. FIG. 5 is a flow chart of the braking force control which is carried out in a repeated manner, in order to avoid that the running vehicle 1 collides with the preceding vehicle 40. This control is achieved by a control program which is executed in the braking force control apparatus 10.

First, in step S101, it is determined by the obstacle detection part 11 whether there exists an obstacle with respect to running of the vehicle 1. When an affirmative determination is made in this processing, the processing of step S102 and thereafter is carried out, whereas when a negative determination is made, this processing is carried out again. Here, note that in this embodiment, an explanation of the processing of step S102 and thereafter will be made, on the assumption that the preceding vehicle 40 has been detected as an obstacle to the vehicle 1. After the processing of the step S101 is completed, the control process goes to step S102.

In step S102, in cases where the driver is going to avoid the detected preceding vehicle by performing avoidance steering, a calculation of the avoidance lateral width distance W, which is a distance for which the vehicle 1 should be moved in the lateral direction, is carried out. Specifically, the calculation of the distance for which the vehicle 1 should be moved in the lateral direction is carried out by processing images including the preceding vehicle 40 picked up by the vehicle mounted camera 23. Because such image processing is based on a conventional technology, a detailed explanation thereof is omitted in this description. Here, note that in cases where the vehicle mounted camera 23 is not mounted on the vehicle 1, the value of a general lane width (for example, 3.5 m) is adopted as the avoidance lateral width distance W. After the processing of the step S102 is completed, the control process goes to step S103.

In step S103, an estimation of a road surface friction between the road surface on which the vehicle 1 is running and the vehicle 1 is carried out by the friction estimation part 13. For example, in cases where a rain sensor for detecting rainy weather is mounted on the vehicle 1, when it is judged by the sensor that the weather condition in which the vehicle 1 is placed is rainy weather, the road surface friction coefficient μ may be made lower in comparison with the case where it is not rainy weather. As an example, the load surface friction coefficient μ in the case of rainy weather is set to 0.6, and the load surface friction coefficient μ in the case of not being rainy weather is set to 0.8. After the processing of the step S103 is completed, the control process goes to step S104.

In step S104, it is determined whether the state of the vehicle 1 at the current point in time is a state in which a collision of the vehicle 1 with the preceding vehicle 40 can be avoided by avoidance steering of the driver 2. Specifically, in cases where the period of time TTC until the collision calculated based on the inter-vehicle distance between the vehicle 1 and the preceding vehicle 40 obtained by making use of the detection result by the radar device 20 and a speed difference between the vehicle 1 and the preceding vehicle 40 is equal to or less than a predetermined value, a determination is made that even if the driver 2 immediately carries out avoidance steering, it is impossible to avoid the collision in light of the running performance of the vehicle 1, etc. When an affirmative determination is made in step S104, the control process goes to step S105, whereas when a negative determination is made, the control process goes to step S111.

In step S105, the change over time of the lateral force necessary for avoiding the collision with the preceding vehicle 40 is predicted by the lateral force prediction part 12, as explained based on the middle row in FIG. 3. Thereafter, in step S106, the change over time of the braking force which can be theoretically generated is calculated by the braking force change over time calculation part 14 based on the lateral force change over time predicted in step S105 and the road surface friction estimated in step S103, as explained based on the lower row in FIG. 3, etc.

When the processing of step S106 is completed, then in step S107, the maximum value Gxmax of the actual braking force is decided by the maximum braking force decision part 15 based on the braking force change over time calculated in S106, and the reduction change over time of the actual braking force according to the predetermined reduction processing carried out by the braking force control part 16, as explained based on the lower row in FIG. 3, etc. After the processing of the step S107 is completed, the control process goes to step S108.

In step S108, it is determined whether the avoidance steering by the driver 2 has actually been carried out. Specifically, the presence or absence of the avoidance steering is determined based on the detection result from the yaw rate sensor 22 or the vehicle speed sensor 21, the amount of movement in the lateral direction of the preceding vehicle 40 during the image pick-up operation of the vehicle mounted camera 23, the steering angle of the steering wheel 4, etc. When an affirmative determination is made in step S108, the control process goes to step S110, whereas when a negative determination is made, the control process goes to step S109.

Here, in cases where the control process goes to step S109, it is in a condition in which actual avoidance steering has not yet been carried out under a condition in which collision avoidance is possible by the avoidance steering of the driver 2. Accordingly, in such a case, a forced actual braking force is applied with respect to the vehicle 1 through the brake actuator 30. However, the actual braking force to be applied will be made to rise with the maximum value Gxmax decided in step S107 being set as an upper limit.

Then, in cases where the control process goes to step S110, it is in a condition in which actual avoidance steering is carried out under the condition in which collision avoidance is possible by the avoidance steering of the driver 2. In such a case, the predetermined reduction processing is carried out with respect to the actual braking force, as stated above. As a result, the actual braking force reduces, as shown by the reduction change over time L3' indicated in the lower row of FIG. 3.

Subsequently, in cases where the control process goes to step S111, it is in a condition in which collision avoidance is impossible by the avoidance steering of the driver 2. In such a case, in order to decrease the speed of the vehicle 1, ordinary braking by the braking force control part 16 is carried out. This ordinary braking is processing which reduces or decreases the speed of the vehicle 1 by means of as large a braking force as possible to such an extent that the wheels of the vehicle 1 do not lock. Accordingly, the actual braking force in this case follows the change over time indicated by the dotted line L3" in the lower row of FIG. 3.

Here, note that the individual processing according to steps S109, S110 and S111 is carried out by the braking force control part 16. According to the this control, in a situation where a collision with the preceding vehicle can be avoided by the avoidance steering of the driver 2, the control operation in which the maximum value of the actual braking force is set to Gxmax is carried out, and the reduction processing is carried out with respect to the actual braking force when the avoidance steering by the driver 2 is detected. Then, in the course of the reduction processing, the ratio or percentage that the actual braking force exceeds a braking force which can be theoretically applied is set to be equal to or less than the predetermined ratio, as a result of which it becomes possible to ensure a lateral force required for collision avoidance to a necessary and sufficient extent during the avoidance operation of the vehicle 1. In addition, in a situation where a collision with the preceding vehicle can not be avoided by the avoidance steering of the driver 2, as quick deceleration of the vehicle 1 as possible is carried out according to the ordinary braking.

<Modification>

A modification with respect to the above-mentioned estimation processing of the road surface friction will be disclosed below. A road surface is imaged or picked up by means of the vehicle mounted camera 23, and based on the state of the road surface thus picked up, the state of the road surface on which the vehicle 1 is running may be classified into, for example, a dry state, a wet state in which the road surface is wet with rain water, a compacted snow state in which compacted snow is deposited on the road surface, and a frozen state in which the road surface is frozen, so that specified load surface friction coefficients μ corresponding to the individual states, respectively, may be each adopted as an estimated value in step S103. As an example, individual load surface friction coefficients in the dry state, in the wet state, in the compacted snow state and in the frozen state may also be set as 1, 0.7, 0.3, and 0.1, respectively.

In addition, the possibility that the forced braking force and the avoidance steering by the driver 2 will actually interfere with each other may often be high in a case where the road surface on which the vehicle 1 is running is in the dry state. This is because when the road surface is in the wet state, in the compacted snow state, or in the frozen state, the fact that the lateral force transmitted from the road surface to the vehicle 1 is weak is liable to be transmitted to the driver 2 instinctively, and hence, the driver 2 has a mental tendency to carry out avoidance steering in a situation where the distance to the obstacle is relatively long, and in such a case, it is difficult for the forced braking force and the avoidance steering by the driver 2 to interfere with each other. In view of such circumstances, in the braking force control shown in FIG. 5, instead of carrying out the estimation processing of road surface friction in step S103, a coefficient of friction μ (e.g., 1) at the time when the road surface is in the dry state in which the forced braking force and the avoidance steering by the driver 2 tend to interfere with each other may always be adopted as a prescribed value.

Second Embodiment

Figure 6:
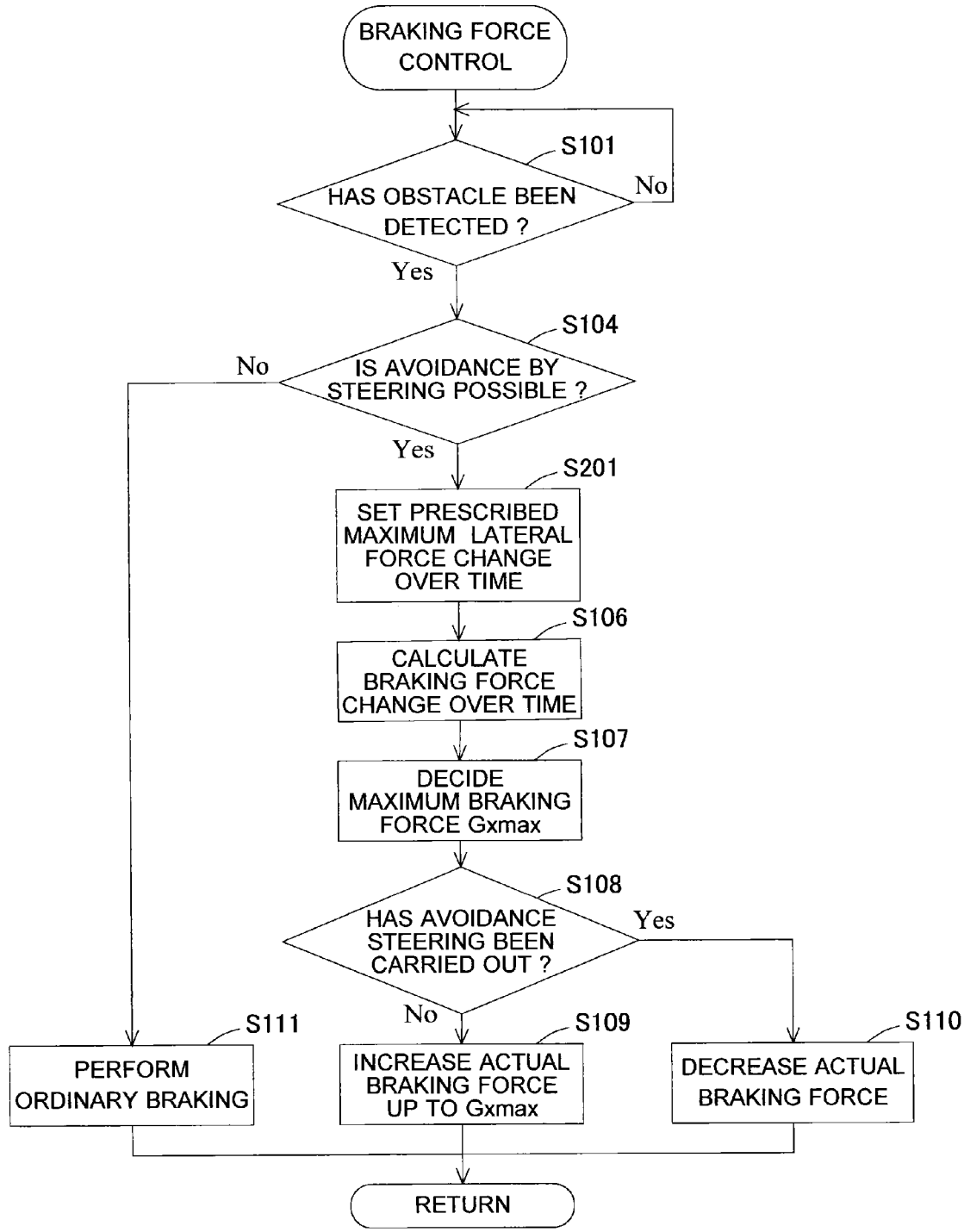
FIG. 6 is a second flow chart with respect to the braking force control carried out by the braking force control apparatus shown in FIG. 1.

A second embodiment of braking force control carried out by the braking force control apparatus 10 according to the present invention will be described based on FIG. 6. FIG. 6 is a flow chart for the braking force control, wherein this control is achieved by a control program which is executed in the braking force control apparatus 10. The same reference numbers in this second embodiment are attached to the same processings as those in the braking force control shown in the above-mentioned first embodiment, and a detailed explanation there is omitted.

In this embodiment, no provision is made for the calculation processing of the avoidance lateral width distance W in step S102 and the estimation processing of the road surface friction in step S103 shown in the first embodiment. Instead of these processings, as shown in the above-mentioned first embodiment, a prescribed value of the lane width is always adopted as the avoidance lateral width distance W, and a coefficient of friction as a prescribed value at the time of the dry state is always adopted as the load surface friction coefficient μ. Then, when an affirmative determination is made in step S104, the processing of step S201 is carried out in place of the processing of S105.

Here, in step S201, a prescribed maximum lateral force change over time is set by the lateral force prediction part 12. This prescribed maximum lateral force change over time is a maximum lateral force change over time for avoiding a collision at the time when the vehicle 1 approaches the preceding vehicle 40 as much as possible under the condition that collision avoidance is possible by avoidance steering, irrespective of the actual relative positional relation between the vehicle 1 and the preceding vehicle 40. Accordingly, in the vehicle 1, when this prescribed maximum lateral force change over time can be obtained, a necessary lateral force change over time can always be ensured under the condition that collision avoidance is possible by avoidance steering. Then, this prescribed maximum lateral force change over time is calculated based on experiments, etc., which have been conducted in advance with respect to the vehicle 1, and is adopted by the braking force control apparatus 10. After the processing of the step S201 is completed, the processing of step S106 and thereafter will be carried out.

According to this control, in the running of the vehicle 1, the lateral force required to the maximum extent will always be ensured under the condition that collision avoidance is possible by avoidance steering.

Third Embodiment

Although in the above-mentioned first embodiment and second embodiment, the lateral force prediction part 12 predicts the change over time of the lateral force necessary for avoidance of the preceding vehicle 40 which is an obstacle, instead of this, the value of a lateral force which is not continuous in time may be predicted, and the limitation processing of the actual braking force to be applied with respect to the vehicle 1 in a forced manner may be carried out so as to ensure that lateral force. For example, based on the avoidance lateral width distance W and the period of time TTC until the vehicle 1 collides with the preceding vehicle 40, the largest lateral force necessary for the vehicle 1 to avoid the preceding vehicle 40 may be calculated, and the actual braking force may be limited so that the lateral force thus calculated can be ensured. In this case, it may be constructed such that in consideration of the timing at which the maximum lateral force is required, the actual braking force is limited at the point in time of that timing. According to this, it is possible to ensure the lateral force required at the time of avoidance steering.

EXPLANATION OF REFERENCE NUMERALS AND CHARACTERS

1 . . . vehicle
2 . . . driver
3 . . . driver's seat
4 . . . steering wheel
10 . . . braking force control apparatus
20 . . . radar device
21 . . . vehicle speed sensor
22 . . . yaw rate sensor
23 . . . vehicle mounted camera
30 . . . brake actuator

The invention claimed is:

1. A braking force control apparatus for a vehicle which controls a braking force applied to the vehicle based on a relation thereof with an obstacle ahead of the vehicle, irrespective of a braking operation of a driver, said braking force control apparatus comprising:
   an obstacle detection part that detects the obstacle located ahead of said vehicle;
   a lateral force prediction part that predicts a lateral force which can be generated in cases where avoidance steering is carried out by the driver, in order to avoid the obstacle detected by said obstacle detection part; and
   a braking force control part that limits an actual braking force actually applied to the vehicle in a longitudinal direction thereof, in accordance with a braking force in the longitudinal direction of the vehicle which is calculated based on a friction of the vehicle with respect to a road surface on which said vehicle is running, and the lateral force predicted by said lateral force prediction part, wherein
   said lateral force prediction part predicts a change over time of the lateral force which can be generated in cases where avoidance steering is carried out by the driver, in order to avoid the obstacle detected by said obstacle detection part; and
   said braking force control part calculates a change over time of the braking force which can be applied to the vehicle in the longitudinal direction thereof, based on the friction of the vehicle with respect to the road surface on which said vehicle is running, and the change over time of the lateral force predicted by said lateral force prediction part, and limits the actual braking force so that an interference ratio of the change over time of a reduction of said actual braking force according to a predetermined reduction processing which is carried out when avoidance steering of the driver is detected at the time of application of the braking force, with respect to the calculated change over time of the braking force which can be applied to the vehicle in the longitudinal direction thereof is equal to or less than a predetermined ratio.

2. The braking force control apparatus for a vehicle as set forth in claim 1, wherein
   said predetermined ratio is a value such that the vehicle behavior at the time of avoidance steering being carried out by the driver can avoid said obstacle.

3. The braking force control apparatus for a vehicle as set forth in claim 1, wherein
   in a vicinity where said calculated change over time of the braking force which can be applied in the longitudinal direction becomes zero, said braking force control part limits said actual braking force in such a manner that a period of time in which the change over time of the reduction of said actual braking force interferes with the change over time of said braking force becomes equal to or less than a predetermined period of time which corresponds to said predetermined ratio.

4. The braking force control apparatus for a vehicle as set forth in claim 1, further comprising:
   an avoidance steering detection part that detects an avoidance steering operation of the driver;
   wherein said braking force control part carries out said predetermined reduction processing which reduces said actual braking force in accordance with a predetermined straight line or a predetermined reduction curve according to an elapsed time, when the avoidance steering of the driver is detected.

5. The braking force control apparatus for a vehicle as set forth in claim 1, wherein
said lateral force prediction part predicts said change over time of the lateral force which can be generated, based on an avoidance lateral width distance for avoiding the obstacle detected by said obstacle detection part and an arrival period of time required for said vehicle to arrive at said obstacle.

6. The braking force control apparatus for a vehicle as set forth in claim 5, wherein
said lateral force prediction part predicts said change over time of the lateral force which can be generated, as a change over time of a curved line shape which has a local maximal value in the middle of avoiding said obstacle.

7. The braking force control apparatus for a vehicle as set forth in claim 6, wherein
said lateral force prediction part changes said local maximal value in accordance with said avoidance lateral width distance.

8. The braking force control apparatus for a vehicle as set forth in claim 1, further comprising:
a friction estimation part that estimates a friction of the vehicle with respect to the road surface on which said vehicle is running, based on at least one of a weather condition under which the vehicle is placed and a state of said road surface.

9. The braking force control apparatus for a vehicle as set forth in claim 2, wherein
in a vicinity where said calculated change over time of the braking force which can be applied in the longitudinal direction becomes zero, said braking force control part limits said actual braking force in such a manner that a period of time in which the change over time of the reduction of said actual braking force interferes with the change over time of said braking force becomes equal to or less than a predetermined period of time which corresponds to said predetermined ratio.

* * * * *